(12) United States Patent
Shamoto et al.

(10) Patent No.: US 8,651,518 B2
(45) Date of Patent: Feb. 18, 2014

(54) REAR SEAT SIDE AIRBAG DEVICE

(75) Inventors: Takehisa Shamoto, Toyota (JP); Osamu Fukawatase, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/879,870

(22) PCT Filed: Oct. 20, 2010

(86) PCT No.: PCT/JP2010/068523
§ 371 (c)(1),
(2), (4) Date: Apr. 17, 2013

(87) PCT Pub. No.: WO2012/053082
PCT Pub. Date: Apr. 26, 2012

(65) Prior Publication Data
US 2013/0200599 A1 Aug. 8, 2013

(51) Int. Cl.
*B60R 21/207* (2006.01)
(52) U.S. Cl.
USPC ........................................... 280/730.2
(58) Field of Classification Search
USPC ............. 280/728.1, 728.2, 728.3, 729, 730.1, 280/730.2
See application file for complete search history.

(56) References Cited

U.S. PATENT DOCUMENTS

| | | | |
|---|---|---|---|
| 6,089,594 A * | 7/2000 | Hasegawa et al. | 280/730.2 |
| 6,189,916 B1 | 2/2001 | Bowers et al. | |
| 6,450,528 B1 * | 9/2002 | Suezawa et al. | 280/730.2 |
| 6,561,540 B1 * | 5/2003 | Hasegawa et al. | 280/730.2 |
| 7,681,907 B2 * | 3/2010 | Svenbrant et al. | 280/728.2 |
| 8,079,640 B2 * | 12/2011 | Kim et al. | 297/224 |
| 8,439,394 B2 * | 5/2013 | Tracht | 280/728.3 |
| 2006/0061073 A1 | 3/2006 | Naruse et al. | |
| 2007/0170707 A1 | 7/2007 | Sato et al. | |
| 2007/0182135 A1 | 8/2007 | Kai et al. | |
| 2007/0228701 A1 | 10/2007 | Yamamura | |
| 2008/0100044 A1 * | 5/2008 | Cho | 280/730.2 |
| 2009/0039623 A1 | 2/2009 | Kawabe et al. | |

FOREIGN PATENT DOCUMENTS

| | | |
|---|---|---|
| JP | A-10-129399 | 5/1998 |
| JP | A-2003-118528 | 4/2003 |
| JP | A-2003-335210 | 11/2003 |
| JP | A-2006-88850 | 4/2006 |
| JP | A-2007-210371 | 8/2007 |
| JP | A-2007-276522 | 10/2007 |
| JP | A-2009-40326 | 2/2009 |
| JP | A-2009-101739 | 5/2009 |
| JP | A-2010-120407 | 6/2010 |

* cited by examiner

*Primary Examiner* — Paul N Dickson
*Assistant Examiner* — Robert A Coker
(74) *Attorney, Agent, or Firm* — Oliff, PLC

(57) ABSTRACT

A side airbag may be smoothly deployed when there is a side collision, and damage to the side airbag at edges of a module case is prevented or suppressed. A recess portion is formed in a seat frame made of resin, and an airbag module is accommodated in the recess portion. The airbag module is provided with a module case in a substantial box shape. An upper side gap is formed between an upper wall portion and an upper end of a side airbag, and a lower side gap is formed between a lower wall portion and a lower end of the side airbag. A length of the upper wall portion is set shorter than a length of an upper wall portion of the recess portion. As a result, the side airbag is less likely to come into contact with the upper wall portion of the module case.

6 Claims, 9 Drawing Sheets

REAR SEAT SIDE AIRBAG DEVICE

TECHNICAL FIELD

The present invention relates to a side airbag device for a rear seat.

BACKGROUND ART

In a rear seat side airbag device disclosed in the below-identified Patent Document 1, an airbag module is disposed inside a deck side trim provided at a vehicle width direction outer side of a seatback of a rear seat. A tear portion is specified in the deck side trim. When an inflation pressure of the side airbag reaches a predetermined value, the tear portion ruptures and the side airbag is deployed to a vehicle forward side thereof Patent Document 1: Japanese Patent Application Laid-Open (JP-A) No. 2010-120407

DISCLOSURE OF INVENTION

Technical Problem

When the related art technology mentioned above is used, there is a large space at the vehicle rearward side of the rear seat side airbag device. Consequently, when the side airbag deploys, it is necessary to make a deployment action of the side airbag stable and regulate a deployment direction of the side airbag to be to the vehicle forward side. Currently, therefore, the side airbag is folded up and accommodated in a module case made of metal.

However, in recent years the performance requirements of rear seat side airbag devices have been raised and it has become necessary to cover wide ranges, including the waist areas of seat occupants, with side airbags. However, in a configuration in which a side airbag of increased size is folded up and accommodated in a module case made of metal, the walls of the module case may interfere with the side airbag when the side airbag is deploying, and it may be difficult for the side airbag to deploy smoothly. Above all, in light of the tendency for side airbags to become larger in a vehicle up-and-down direction, it seems that a side airbag is likely to interfere with wall portions of the module case when deploying. Moreover, when a module case made of metal is employed, an upper end face side of the side airbag may come into contact with an edge of the module case and be damaged.

In light of the above situation, an object of the present invention is to provide a rear seat side airbag device in which a side airbag may be smoothly deployed when there is a side impact and in which damage to the side airbag from edges of a module case may be prevented or suppressed.

Solution to Problem

A rear seat side airbag device according to a first aspect includes a recess portion formed in a seat frame fabricated of resin, the seat frame being disposed at an inner side of a side support portion of a seatback of a rear seat, and a seatback forward side of the recess portion being open; a module case fabricated of metal that is formed in a box shape, the module case being accommodated in the recess portion such that the seatback forward side of the module case is an open side, such that an upper wall portion of the module case is disposed at the inner side of an interior wall upper portion of the recess portion and such that a lower wall portion of the module case is disposed at the inner side of an interior wall lower portion of the recess portion; an inflator that is accommodated in the module case and that produces gas when operated; and a side airbag that is accommodated in the module case in a folded state and that is deployed to the seatback forward side when the gas flows into the side airbag, wherein the upper wall portion and lower wall portion of the module case are provided standing at positions spaced apart from an upper end and a lower end of the side airbag in the folded state such that a tip edge of the upper wall portion of the module case and a tip edge of the lower wall portion of the module case are spaced apart from a surface of the side airbag in the deployed state.

According to the first aspect, the seat frame made of resin is disposed at the inner side of the side support portion of the rear seat seatback. The recess portion whose seatback forward side is open is formed in the seat frame, and the module case formed in the box shape is accommodated in this recess portion.

When there is a side impact, the inflator accommodated in the module case operates and produces gas. The gas flows into the side airbag that is accommodated in the module case in the folded state. As a result, the side airbag inflates, and the side airbag inflates and deploys to the seatback forward side of the side support portion. Hence, the side airbag inflates and deploys between a side portion of the upper body of a seat occupant and a vehicle body side portion such as a side door or the like.

If, for example, both the waist area and torso area are to be protected by a single side airbag, the size of the side airbag is increased in the height direction of the seatback. When this large a side airbag is used and the side airbag is inflating and deploying, the surface of the side airbag may come into contact with the tip edge of an upper wall portion of a module case, the tip edge of a lower wall portion of the same, or the like, and deployment of the side airbag may be impeded or the surface of the side airbag may be damaged.

However, according to the present aspect, the upper wall portion and lower wall portion of the module case are disposed at positions that are spaced apart from the upper end and lower end of the side airbag in the folded state, such that the tip edge of the upper wall portion and the tip edge of the lower wall portion of the module case are spaced apart from the surface of the side airbag in the deployed state. In other words, substantial gaps are respectively formed between the tip edge of the upper wall portion of the module case and the upper end of the side airbag in the folded state, and between the tip edge of the lower wall portion of the module case and the lower end of the side airbag in the folded state. Therefore, the possibility of contact between the side airbag and the upper wall portion tip edge and lower wall portion tip edge of the module case is reduced remarkably.

In a rear seat side airbag device according to a second aspect, in the first aspect, a length of the upper wall portion of the module case is set shorter than a length of the interior wall upper portion of the recess portion.

Until deployment of a side airbag is complete, the side airbag pitches in the seatback height direction and the deployment action is unstable. In such a case, even if the tip edge of the upper wall portion of a module case is spaced apart from the surface of the deployed shape of the side airbag, the side airbag may swing round to the outer side of the tip edge of the upper wall portion.

In contrast, in the present aspect, the length of the upper wall portion of the module case is shorter than the length of the interior wall upper portion of the recess portion. Therefore, the upper end side of the side airbag first makes contact with the tip edge of the interior wall upper portion of the recess portion provided in the seat frame made of resin. Therefore, the side airbag does not make strong contact with the tip edge of the upper wall portion of the module case.

In a rear seat side airbag device according to a third aspect, in the first aspect, a length of the lower wall portion of the module case is set shorter than a length of the interior wall lower portion of the recess portion.

Until deployment of a side airbag is complete, the side airbag pitches in the seatback height direction and the deployment action is unstable. In such a case, even if the tip edge of the lower wall portion of a module case is spaced apart from the surface of the deployed shape of the side airbag, the side airbag may swing round to the outer side of the tip edge of the lower wall portion.

In contrast, in the present aspect, the length of the lower wall portion of the module case is shorter than the length of the interior wall lower portion of the recess portion. Therefore, the lower end side of the side airbag first makes contact with the tip edge of the interior wall lower portion of the recess portion provided in the seat frame made of resin. Therefore, the side airbag does not make strong contact with the tip edge of the lower wall portion of the module case.

In a rear seat side airbag device according to a fourth aspect, in any one of the first to third aspects, at least one of a tip edge portion of the upper wall portion of the module case or a tip edge portion of the lower wall portion of the module case is inflected to the outer side of the module case.

According to the fourth aspect, at least one of the upper wall portion tip edge portion or the lower wall portion tip edge portion of the module case is inflected to the module case outer side thereof. Therefore, the side airbag is very unlikely to come into contact with the tip edge portion at the inflected side.

In a rear seat side airbag device according to a fifth aspect, in any one of the first to third aspects, at least one of a tip edge portion of the upper wall portion of the module case or a tip edge portion of the lower wall portion of the module case is folded back to the outer side of the module case.

According to the fifth aspect, at least one of the upper wall portion tip edge portion or the lower wall portion tip edge portion of the module case is folded back to the module case outer side thereof. Therefore, the side airbag is very unlikely to come into contact with a rim at the folded-back side.

In a rear seat side airbag device according to a sixth aspect, in any one of the first to fifth aspects, a protrusion portion formed at a seatback pad is inserted into at least one of a lower portion gap formed between the lower wall portion of the module case and the interior wall lower portion of the recess portion, or an upper portion gap formed between the upper wall portion of the module case and the interior wall upper portion of the recess portion.

According to the sixth aspect, the protrusion portion(s) formed at the seatback pad is/are inserted into at least one of the lower portion gap, which is formed between the lower wall portion of the module case and the interior wall lower portion of the recess portion, or the upper portion gap, which is formed between the upper wall portion of the module case and the interior wall upper portion of the recess portion. Therefore, if the side support portion is pressed from a design surface side thereof in the cabin, the side support portion is unlikely to recess in an unintended manner.

Advantageous Effects of Invention

As described hereabove, the rear seat side airbag device according to the first aspect has excellent effects in that the side airbag may be smoothly deployed when there is a side impact and in that damage to the side airbag from edges of the module case may be prevented or suppressed.

The rear seat side airbag device according to the second aspect has an excellent effect in that damage to the surface of the upper end side of the side airbag may be more effectively prevented or suppressed.

The rear seat side airbag device according to the third aspect has an excellent effect in that damage to the surface of the lower end side of the side airbag may be more effectively prevented or suppressed.

The rear seat side airbag device according to the fourth aspect has an excellent effect in that damage to the surface of the side airbag may be even more effectively prevented or suppressed.

The rear seat side airbag device according to the fifth aspect has an excellent effect in that damage to the surface of the side airbag may be prevented or suppressed more than in the fourth aspect.

The rear seat side airbag device according to the sixth aspect has an excellent effect in that the design appearance of a rear seat side support portion may be excellently maintained.

BEST MODE FOR CARRYING OUT THE INVENTION

Herebelow, an exemplary embodiment of the rear seat side airbag device according to the present invention is described using FIG. 1 to FIG. 9. An arrow FR that is shown as appropriate in these drawings indicates a vehicle forward side, an arrow UP indicates a vehicle upward side, and an arrow IN indicates a vehicle width direction inner side.

Figure 1:
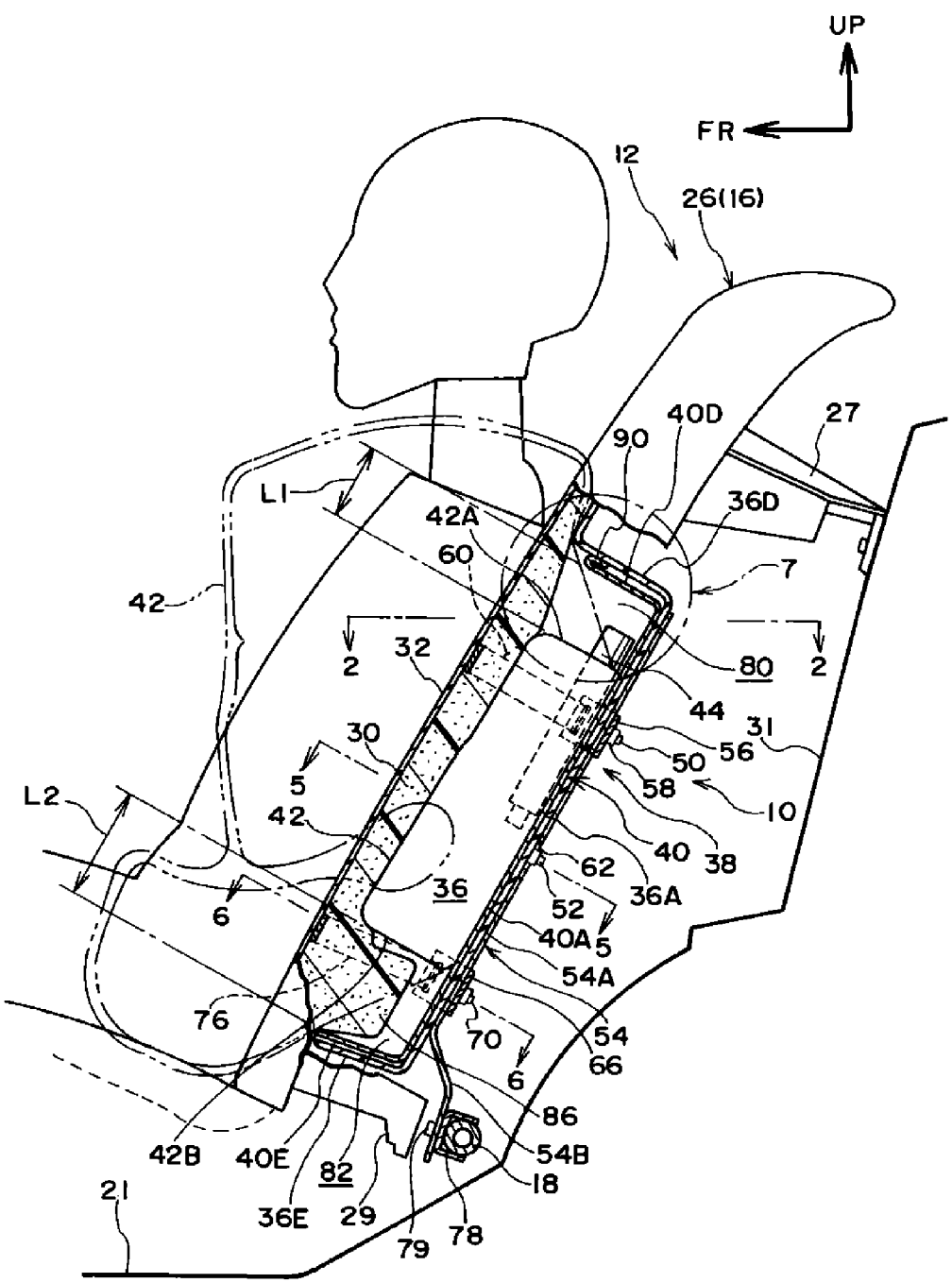
FIG. 1 is a vertical sectional diagram of a rear seat with a structure in which a rear seat side airbag device in accordance with a present exemplary embodiment is employed.
Figure 3:
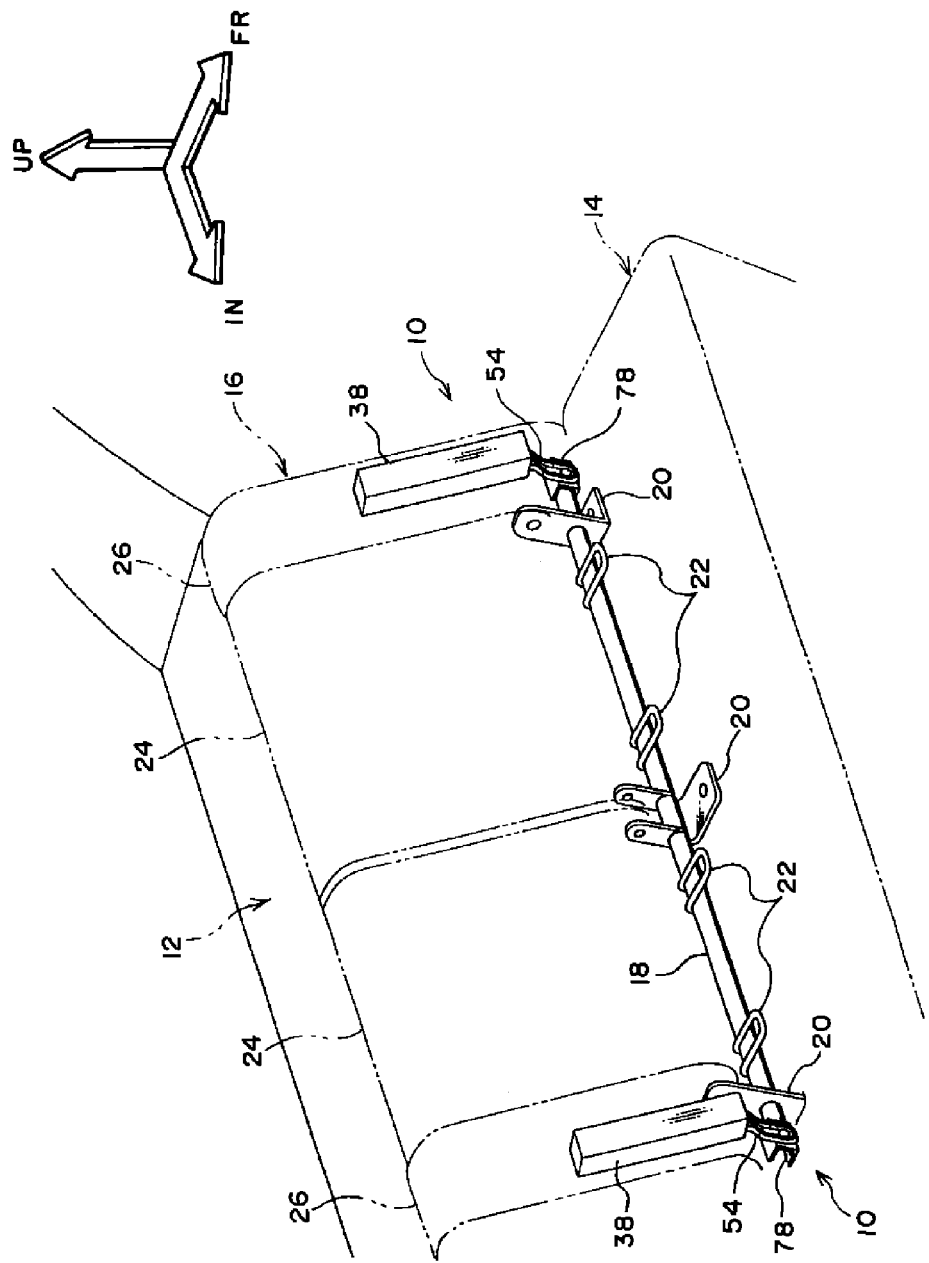
FIG. 3 is a perspective diagram showing overall structure of the rear seat shown in FIG. 1.
Figure 4:
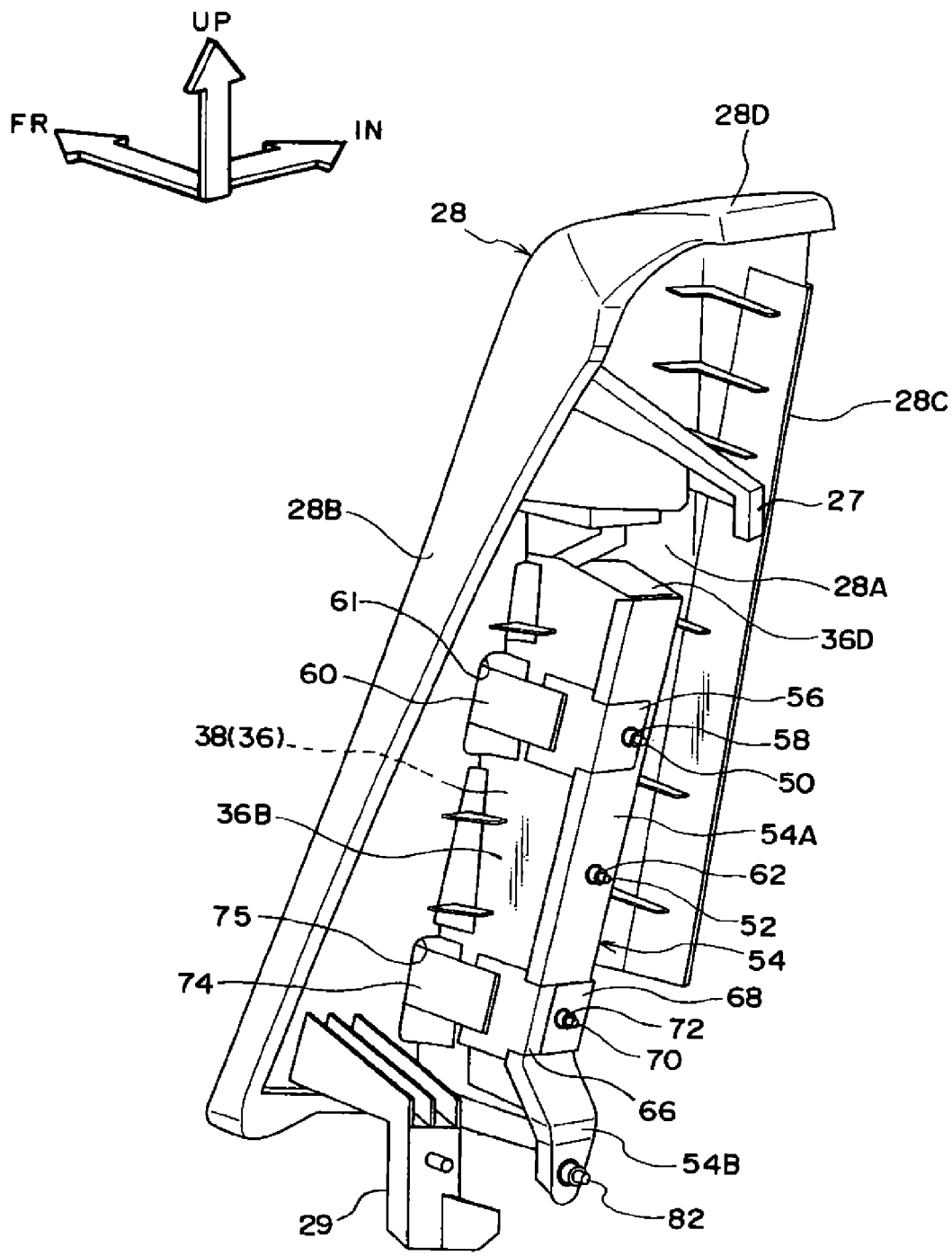
FIG. 4 is a perspective diagram of a seat frame constituting a side seat portion of a rear seatback shown in FIG. 1.

As shown in FIG. 1 and FIG. 3, a rear seat side airbag device 10 according to the present exemplary embodiment is employed at a rear seat 12. The rear seat 12 is provided with a rear seat cushion 14 that supports the buttock area and thigh area of an occupant and a rear seatback 16 that supports the waist area and back area of the occupant. Depending on the type of vehicle, a headrest is provided at an upper end portion of the rear seatback 16.

A child seat fixing member 18 is provided at the lower side of a lower end portion of the rear seatback 16. The child seat fixing member 18 conforms to the ISOFix standards (standards on sizes and attachment methods of fixing devices which have been unified by the International Organisation of Standardisation). The child seat fixing member 18 is formed of a high-strength, high-stiffness pipe member, and is disposed in a state in which a length direction thereof runs along the vehicle width direction. Mounting brackets 20 are fixed by welding or the like at each of two length direction end portions and a length direction middle portion of the child seat fixing member 18. The mounting brackets 20 mount the child seat fixing member 18 to a rear floor 21 (see FIG. 1). Plural strikers 22, which conform to the ISOFix standards, are attached beforehand by welding or the like to the child seat fixing member 18.

The aforementioned rear seatback 16 is a rear seatback of a divided collapsible type, including a pair of left and right main body portions 24 and a pair of left and right side support portions 26. The main body portions 24 are tiltable relative to the rear floor 21, and the side support portions 26 are disposed at vehicle width direction outer sides (vehicle door sides) relative to the main body portions 24.

The pair of left and right main body portions 24 are each provided with a seat frame made of metal, which is not shown in the drawings. Lower end portions of these seat frames are joined, to be turnable about an axis along the vehicle width direction, to upper end portions of the mounting brackets 20. Thus, the rear seatback 16 is tiltable to the rear seat cushion 14 side thereof. At usual times, the main body portions 24 and a back panel 31 (see FIG. 1), which is a vehicle body side structural member, are detachably joined by locking mechanisms (not shown in the drawings) provided at the rear side of each of two side portions of the main body portions 24.

The pair of left and right side support portions 26 are each provided with a seat frame 28 made of resin. As shown in FIG. 1, FIG. 2, and FIG. 4 to FIG. 6, a plan sectional view shape of the seat frame 28 is a substantial "U" shape whose vehicle rearward side is open (see FIG. 2). The seat frame 28 is structured with a front wall portion 28A, a pair of left and right side wall portions 28B and 28C, and a top wall portion 28D (see FIG. 4). The front wall portion 28A serves as a support surface for a pad 30, which is described below. The left and right side wall portions 28B and 28C extend to the vehicle rearward side from each of two vehicle width direction end portions of the front wall portion 28A. The top wall portion 28D extends to the vehicle rearward side from an upper end portion of the front wall portion 28A and joins the pair of left and right side wall portions 28B and 28C in the vehicle width direction. The front wall portion 28A forms a protruding curve shape that bulges to the vehicle forward side, and is formed in a shape in which a lower portion is flared a little wider than an upper portion.

A hook portion 27 is formed, in a hook shape in side view, at an upper portion of a rear face of the above-mentioned front wall portion 28A. The hook portion 27 stands toward the vehicle rearward side. A mounting portion 29 is formed, in a substantial "L" shape in side view, at a lower portion of the rear face of the front wall portion 28A. The mounting portion 29 stands toward the vehicle rearward side. Each seat frame 28 is fixed to the vehicle body side by the hook portion 27 provided at the upper portion side being hooked on a vehicle body side structural member, which is the back panel 31, and the mounting portion 29 provided at the lower end side being fixed by fastening to the back panel 31.

The pad 30, which is formed of a foam body of urethane foam or the like, is mounted at the vehicle forward side of the seat frame 28. A plan sectional view shape of the pad 30 is formed in a protruding curved shape that matches the protruding curved shape of the front wall portion 28A of the seat frame 28. A thinned portion 33 (see FIG. 2) is formed at a position roughly at a vehicle width direction middle portion of the pad 30. At the thinned portion 33, a thickness of the pad 30 in the vehicle front-and-rear direction is reduced.

Figure 5:
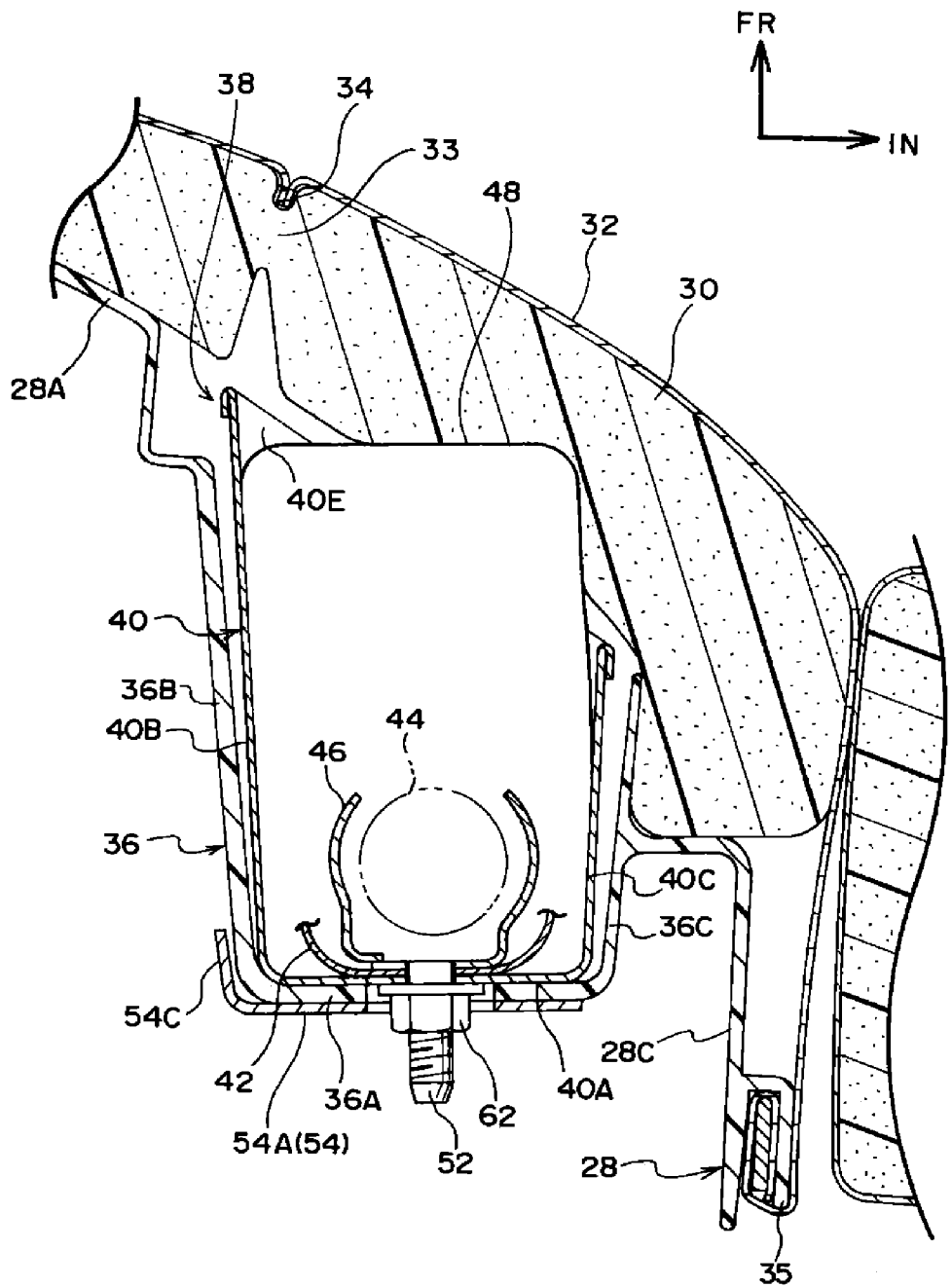
FIG. 5 is a magnified plan sectional diagram of the rear seat side airbag device showing a sectional plane along line 5-5 of FIG. 1.
Figure 6:
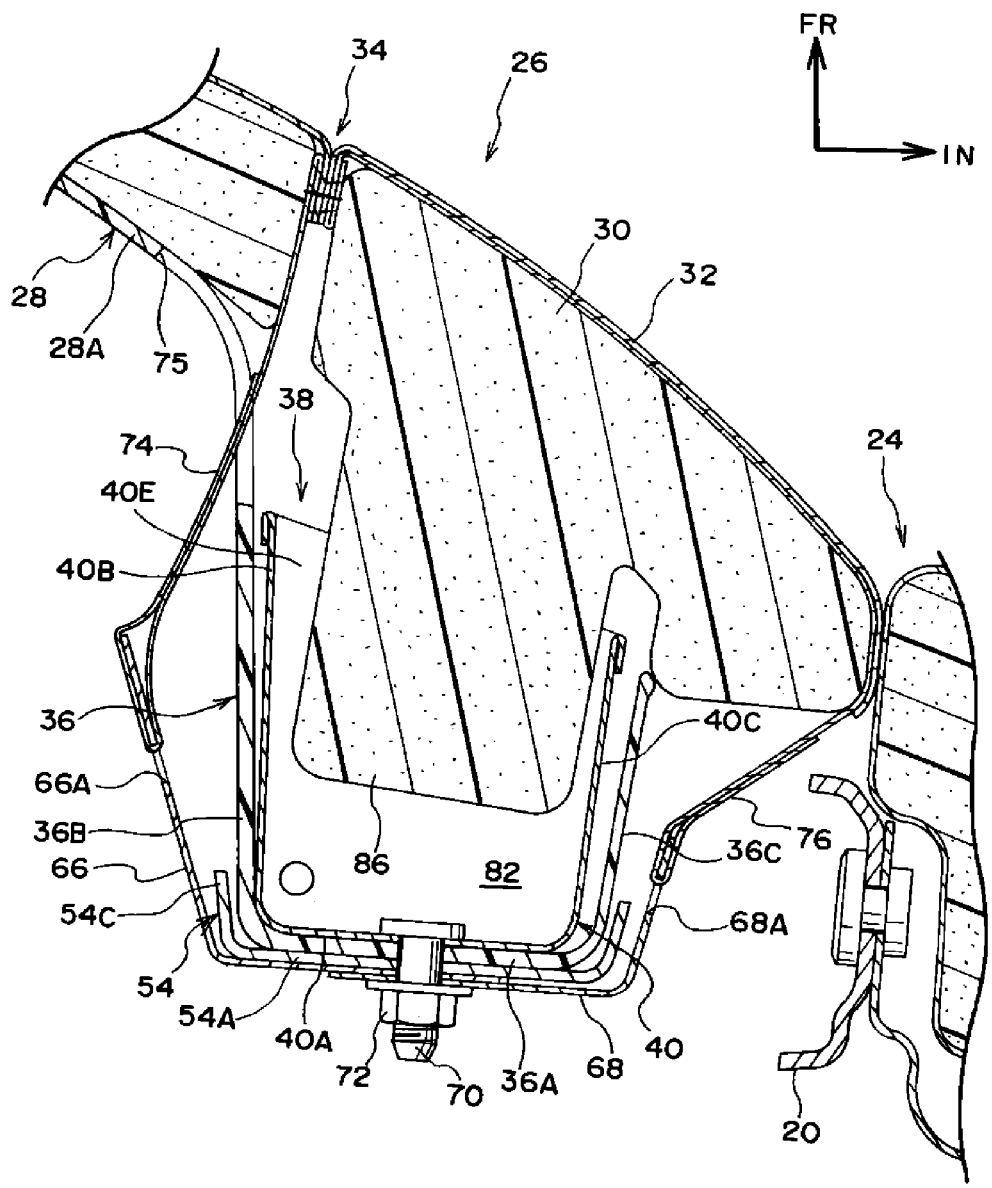
FIG. 6 is a magnified plan sectional diagram of the rear seat side airbag device showing a sectional plane along line 6-6 of FIG. 1.

As shown in FIG. 5 and FIG. 6, the surface of each pad 30 is covered with a cover 32. The cover 32 is partially split between left and right at the position of the pad 30 at which the thinned portion 33 is formed (see FIG. 2). Edge portions of the divided cover 32 are sewn to one another so as to be ruptured by the action of a bag inflation pressure of at least a predetermined value. Hereinafter, this region is referred to as a seam portion 34. In other words, the seam portion 34 serves as a burst line when the rear seat side airbag device 10 operates. An end portion of the cover 32 at the side thereof that is adjacent to the main body portions 24 is anchored at an anchor portion 35 with a "U" shape, which is formed at a rear end portion of the right side wall portion 28C of the seat frame 28.

A recess portion (airbag module mounting portion) 36 is formed at a substantially central portion of the front wall portion 28A of the seat frame 28 described above. The recess portion 36 is recessed to the vehicle rearward side in a substantially cuboid shape. As shown in FIG. 1, FIG. 2, FIG. 5 and FIG. 6, the recess portion 36 is structured by a bottom wall portion 36A, a pair of left and right side wall portions 36B and 36C, and an upper wall portion 36D and a lower wall portion 36E. The bottom wall portion 36A is in a flat rectangular shape along the vehicle width direction and the vehicle up-and-down direction (the seatback height direction). The left and right side wall portions 36B and 36C rise to the vehicle forward side substantially in parallel from both left and right side edges of the bottom wall portion 36A. The upper wall portion 36D and lower wall portion 36E rise to the vehicle forward side substantially in parallel from an upper edge and a lower edge of the bottom wall portion 36A. The upper wall portion 36D corresponds to an "interior wall upper portion of the recess portion" of the present invention, and the lower wall portion 36E corresponds to an "interior wall lower portion of the recess portion" of the present invention.

Figure 7:
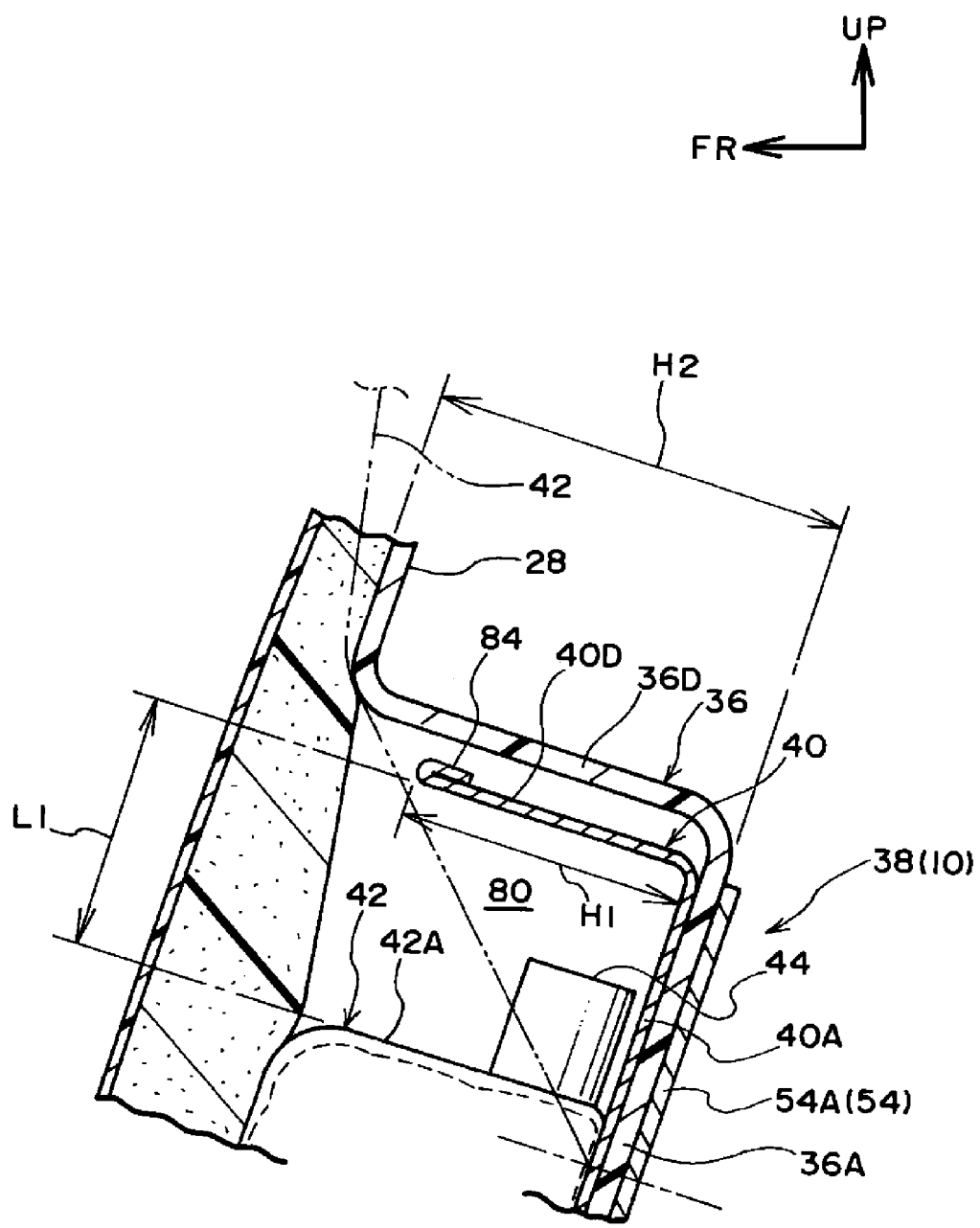
FIG. 7 is a magnified diagram of the portion indicated by arrow 7 in FIG. 1, in which an upper portion side of the module case shown in FIG. 1 is shown magnified.

An airbag module 38, which structures principal portions of the rear seat side airbag device 10, is mounted in the recess portion 36. The airbag module 38 is provided with a module case 40, a side airbag 42 (only a portion of which is shown in FIG. 7), a cylindrical inflator 44, and a diffuser 46. The module case 40 is made of metal and is fitted into the recess portion 36. The side airbag 42 is stowed in the module case 40 in a folded state. The inflator 44 is a gas producer that produces gas in the side airbag 42 when there is a side collision. The diffuser 46 is a flow regulator that encloses the inflator 44.

The module case 40 is formed in a substantial box shape, which is vertically long, of which the vehicle forward side is open. The module case 40 is structured by a bottom wall portion 40A, a pair of left and right side wall portions 40B and 40C, an upper wall portion 40D and a lower wall portion 40E.

The side airbag 42 is folded up by a predetermined folding method (bellows folding in the present exemplary embodiment), and a shape thereof is maintained by being covered with a wrapping material 48. The wrapping material 48 ruptures easily at a time of inflation and deployment of the side airbag 42. Common folding methods of an airbag are roll folding and bellows folding. In the present exemplary embodiment, the airbag is folded up by bellows folding, which is easy to unfold. However, the airbag may be folded by roll folding, and may be folded by a combination of roll folding and bellows folding.

The inflator 44 and the diffuser 46 are disposed inside the folded side airbag 42. As shown in FIG. 1, the inflator 44 is disposed with a length direction thereof along the up-and-down direction of the side support portion 26 (the seatback height direction), and plural gas emission holes are formed in one length direction end portion of the inflator 44 (in this case, the lower end portion). A squib, which is an ignition device, and an ignition agent are disposed in the other length direction end portion of the inflator 44 (in this case, the upper end portion). The squib is electrically connected to an airbag electronic control unit (ECU) that is disposed at the lower side of a console box or the like, and the airbag ECU is electrically connected to a side collision sensor disposed at a side portion of the vehicle body. When the side collision sensor detects a side collision condition of the vehicle, the side collision sensor outputs a detection signal to the airbag ECU. The airbag ECU makes a determination as to whether or not to activate the side airbag 42, and if a determination to activate the side airbag is made, a predetermined electric current is passed through the squib and the ignition agent is ignited. As a result, gas is emitted from the plural gas emission holes formed in the inflator 44. An inflator of a high-pressure gas enclosing type may be used instead of the inflator 44 of a gas-producing agent enclosing type.

As shown in FIG. 5 and FIG. 6, the above-described inflator 44 is covered by the diffuser 46 that functions as a flow regulator, and is fixed to the diffuser 46 at locations which are not shown in the drawings. The diffuser 46 regulates flows of gas emitted from the inflator 44, and supplies the gas to the interior of the side airbag 42.

A pair of upper and lower stud bolts 50 and 52 (see FIG. 1) are provided standing from the diffuser 46. The upper side stud bolt 50 penetrates through the side airbag 42, the bottom wall portion 40A of the module case 40 and the bottom wall portion 36A of the recess portion 36. The stud bolt 50 also penetrates through a bracket reinforcement (a reinforcing plate) 54 made of metal, which is superposed with a rear face of the bottom wall portion 40A, and a webbing bracket 56, which is superposed with a rear face of the bracket reinforcement 54. A distal end side of the stud bolt 50 is threaded into a nut 58. Thus, the upper portion side of the diffuser 46 is fixed by fastening to the module case 40, the bracket reinforcement 54 and the webbing bracket 56, and to the seat frame 28. The side airbag 42 is sandwiched between the diffuser 46 and the bottom wall portion 40A of the module case 40. The airbag module 38 is fixed by fastening to the seat frame 28 at a height range in which the inflator 44 is disposed.

As shown in FIG. 1, the bracket reinforcement 54 is formed in a long, narrow shape along the up-and-down direction of the side support portion 26. The bracket reinforcement 54 includes a frame reinforcement portion 54A and a bracket portion 54B (a projection portion). The frame reinforcement portion 54A has a linear shape in side view. The bracket portion 54B is projected to the downward side of the frame reinforcement portion 54A. The frame reinforcement portion 54A is disposed over substantially the whole of the bottom wall portion 36A of the recess portion 36, excluding a lower end portion of the bottom wall portion 36A. An upper portion side and an up-and-down direction middle portion of the frame reinforcement portion 54A are formed in "L" shapes in cross section, being provided with a flanged portion 54C that is projected to the vehicle forward side from a vehicle width direction outer side end portion of the frame reinforcement portion 54A. The flanged portion 54C improves bending stiffness of the frame reinforcement portion 54A, and the recess portion 36, particularly the bottom wall portion 36A, is reinforced by the frame reinforcement portion 54A.

The webbing bracket 56 is formed by a process of bending a plate made of metal into an "L" shape. A proximal end side of the webbing bracket 56 is superposed with the frame reinforcement portion 54A and is fixed by fastening to the seat frame 28. A distal end side of the webbing bracket 56 is projected to the vehicle forward side from the vehicle width direction outer side of the recess portion 36. An insertion hole, through which one end side of an upper side webbing 60 is inserted, is formed at the distal end side of the webbing bracket 56. The upper side webbing 60 is formed in a belt shape. The upper side webbing 60 is formed of a fabric that is more resistant to stretching than the cover 32. Portions of the upper side webbing 60 preceding and succeeding the insertion through the insertion hole are superposed and sewn together. Thus, the one end side of the upper side webbing 60 is anchored at the webbing bracket 56 and, via the webbing bracket 56, is joined to (anchored at) the frame reinforcement portion 54A and the seat frame 28. The other end side of the upper side webbing 60 is inserted through an aperture 61 formed in the seat frame 28 (see FIG. 4), and is sewn to the seam portion 34 provided at the cover 32. Therefore, when the side airbag 42 is inflating and deploying, the upper side webbing 60 is stretched by inflation pressure of the side airbag 42. Thus, the other end side of the upper side webbing 60 concentrates the inflation pressure of the side airbag 42 on the region of the seam portion 34 to which the other end side of the upper side webbing 60 is sewn, so that the seam portion 34 is ruptured starting from this region.

As shown in FIG. 5, the lower side stud bolt 52 provided at the diffuser 46 penetrates through the side airbag 42 and the bottom wall portion 40A of the module case 40, and a distal end side of the stud bolt 52 is threaded into a nut 62. Thus, the lower portion side of the diffuser 46 is fixed by fastening to the module case 40, and the side airbag 42 is sandwiched between the diffuser 46 and the bottom wall portion 40A of the module case 40. Penetration holes with larger diameters than the nut 62 are formed in the bottom wall portion 36A of the recess portion 36 and the frame reinforcement portion 54A. Thus, the nut 62 and the stud bolt 52 are disposed in a state of not being in contact with the bottom wall portion 36A and the frame reinforcement portion 54A.

As shown in FIG. 6, at the lower end portion side of the recess portion 36, a bolt 70 penetrates through the bottom wall portion 40A of the module case 40, the bottom wall portion 36A of the recess portion 36, the frame reinforcement portion 54A, and webbing brackets 66 and 68. A nut 72 is threaded onto a distal end side of the bolt 70. Thus, the module case 40 is fixed by fastening to the upper end portion of the frame reinforcement portion 54A and the webbing brackets 66 and 68, and to the seat frame 28. The lower portion side of the frame reinforcement portion 54A is formed in an open cross section shape (a substantial "U" shape in cross section) of which the vehicle forward side is open. Thus, stiffness of the frame reinforcement portion 54A with respect to loads in the vehicle front-and-rear direction is improved.

The above-mentioned webbing brackets 66 and 68 are formed by processes of bending plates made of metal into "L" shapes. A proximal end side of the webbing bracket 66 is superposed with the frame reinforcement portion 54A. In a state in which a proximal end side of the webbing bracket 68 is superposed with the proximal end side of the webbing bracket 66, the proximal end sides of the webbing brackets 66 and 68 are fixed by fastening to the frame reinforcement portion 54A and the seat frame 28.

The distal end side of the webbing bracket 66 is projected to the vehicle forward side from the vehicle width direction outer side of the recess portion 36, and the distal end side of the webbing bracket 68 is projected to the vehicle forward side from the vehicle width direction inner side of the recess portion 36. Insertion holes 66A and 68A are formed in the distal end sides of the webbing brackets 66 and 68. One end sides of lower side webbings 74 and 76, which are formed in belt shapes, are inserted through the insertion holes 66A and 68A. The lower side webbings 74 and 76 are formed of the fabric that is more resistant to stretching than the cover 32. Portions of the lower side webbings 74 and 76 preceding and succeeding the insertions through the insertion holes 66A and 68A are superposed and sewn together. Thus, the one end sides of the lower side webbings 74 and 76 are anchored at the webbing brackets 66 and 68 and, via the webbing brackets 66 and 68, are joined to (anchored at) the frame reinforcement portion 54A and the seat frame 28. The other end side of the lower side webbing 74 is inserted through an aperture 75 formed in the seat frame 28, and is sewn to the seam portion 34 provided at the cover 32. The other end side of the lower side webbing 74 is projected between the pad 30 and the cover 32 to the seam portion 34 side, and is sewn to the seam portion 34. Therefore, when the side airbag 42 is inflating and deploying, the lower side webbings 74 and 76 are stretched by the inflation pressure of the side airbag 42. Thus, the other end sides of the lower side webbings 74 and 76 concentrate the inflation pressure of the side airbag 42 on the region of the seam portion 34 to which the other end sides of the lower side webbings 74 and 76 are sewn, so that the seam portion 34 is ruptured starting from this region.

The above-mentioned bracket portion 54B is projected integrally from the lower end of the frame reinforcement portion 54A diagonally to the vehicle rearward side and downward side. Similarly to the lower portion side of the frame reinforcement portion 54A, the bracket portion 54B is formed in an open cross section shape (a substantial "U" shape in cross section) of which the vehicle forward side is open. A structure in which the bracket portion 54B and frame reinforcement portion 54A are formed as separate bodies and joined together by welding or the like is also possible.

The upper portion side of the bracket portion 54B is inflected to the vehicle forward side relative to the lower portion side thereof. A lower end portion of the bracket portion 54B is disposed at the vehicle forward side relative to a length direction end portion (the vehicle width direction outer side end portion) of the child seat fixing member 18. A fastening fixture 78 formed in an open cross section shape (a substantial "U" shape in cross section), of which the vehicle rearward side is open, is attached by welding or the like to each of two length direction end portions of the pipe member structuring the child seat fixing member 18. A welded nut, which is not shown in the drawings, is attached to the fastening fixture 78, and the lower end portion of the bracket portion 54B is fixed by fastening to the fastening fixture 78, by a bolt 79 that is threaded into the welded nut. Thus, the lower end portion of the airbag module 38 is fixed by fastening to the child seat fixing member 18 via the bracket reinforcement 54.

As shown in FIG. 1, FIG. 2, and FIG. 4 to FIG. 6, in the rear seat side airbag device 10 according to the present exemplary embodiment, the substantially box-shaped recess portion 36 for accommodating the airbag module 38 is formed in the seat frame 28 made of resin as described above. The module case 40 made of metal in a similar shape is accommodated in the recess portion 36. Describing the relationships between the upper wall portion 40D and lower wall portion 40E of the module case 40 and the side airbag 42 in the folded state, the upper wall portion 40D and lower wall portion 40E are provided standing from the bottom wall portion 40A at positions that are spaced apart in the seatback height direction from an upper end 42A and a lower end 42B of the side airbag 42. Thus, an upper side gap 80 is formed between the upper wall portion 40D and the upper end 42A of the side airbag 42, and a lower side gap 82 is formed between the lower wall portion 40E and the lower end 42B of the side airbag 42. A separation distance L1 between the upper wall portion 40D and the upper end 42A of the side airbag 42 and a separation distance L2 between the lower wall portion 40E and the lower end 42B of the side airbag 42 are set to distances for separation from the surface of the side airbag 42 in a deployed state (meaning a state in which gas is provided to the interior of the side airbag 42 and the side airbag 42 is completely inflated and deployed as illustrated in FIG. 1), which is to say distances such that the upper wall portion 40D and lower wall portion 40E of the module case 40 made of metal do not come into contact with the upper end 42A and lower end 42B of the side airbag 42.

As is shown magnified in FIG. 7, a length H1 of the upper wall portion 40D of the module case 40 from the bottom wall portion 40A is set to be shorter than a length H2 of the upper wall portion 36D of the recess portion 36 from the bottom wall portion 36A. In the present exemplary embodiment, the length of the lower wall portion 40E of the module case 40 is set to be substantially the same as the length of the lower wall portion 36E of the recess portion 36 (see FIG. 1), but may be set shorter, similarly to the upper wall portion 40D. A height of the whole of a periphery portion of the module case 40 (the upper wall portion 40D, the lower wall portion 40E and the pair of left and right side wall portions 40B and 40C) may be set lower than the height of the interior wall portions of the recess portion 36. Further, although the length H1 of the upper wall portion 40D of the module case 40 is set shorter than the length H2 of the upper wall portion 36D of the recess portion 36, it is not necessary for the length of the upper wall portion 40D (and that of the lower wall portion 40E) to be set as low as possible. If the lengths of the upper wall portion 40D and the lower wall portion 40E were to be set to zero (i.e., the upper wall portion 40D and lower wall portion 40E were eliminated), there would be no members restraining the left and right side wall portions 40B and 40C from opening apart. Consequently, the side airbag 42 would inflate excessively in the vehicle width direction when deploying, and deployment performance would deteriorate.

Rim portions of the upper wall portion 40D and the pair of left and right side wall portions 40B and 40C are folded back by a hemming process. Herebelow, the folded-back portions are referred to as a folded-back portion 84. In the present exemplary embodiment, the rim portions are folded back by the hemming process at all peripheral portions of the module case 40 except the lower wall portion 40E (the upper wall portion 40D and the left and right side wall portions 40B and 40C), but this is not limiting. It is sufficient if at least the rim portion of the upper wall portion 40D is folded back to provide the folded-back portion 84.

A protrusion portion 86 in a block shape (a substantially cuboid shape) is provided at a lower end portion of the pad 30. The protrusion portion 86 is inserted into the lower side gap 82 formed in the module case 40 described above. The protrusion portion 86 is integrally formed to be oriented to the vehicle rearward side from the lower end portion of the pad 30, and is inserted along the lower end 42B of the side airbag 42 in the folded state to near the bottom wall portion 40A of the module case 40. In the present exemplary embodiment, a structure in which the protrusion portion 86 is inserted at the upper side gap 80 is not employed. However, a structure may be employed in which a protrusion portion with a similar shape to the protrusion portion 86 is formed at the upper end portion side of the pad 30 and inserted into the upper side gap 80.

Next, operation and effects of the present exemplary embodiment are described.

Figure 2:
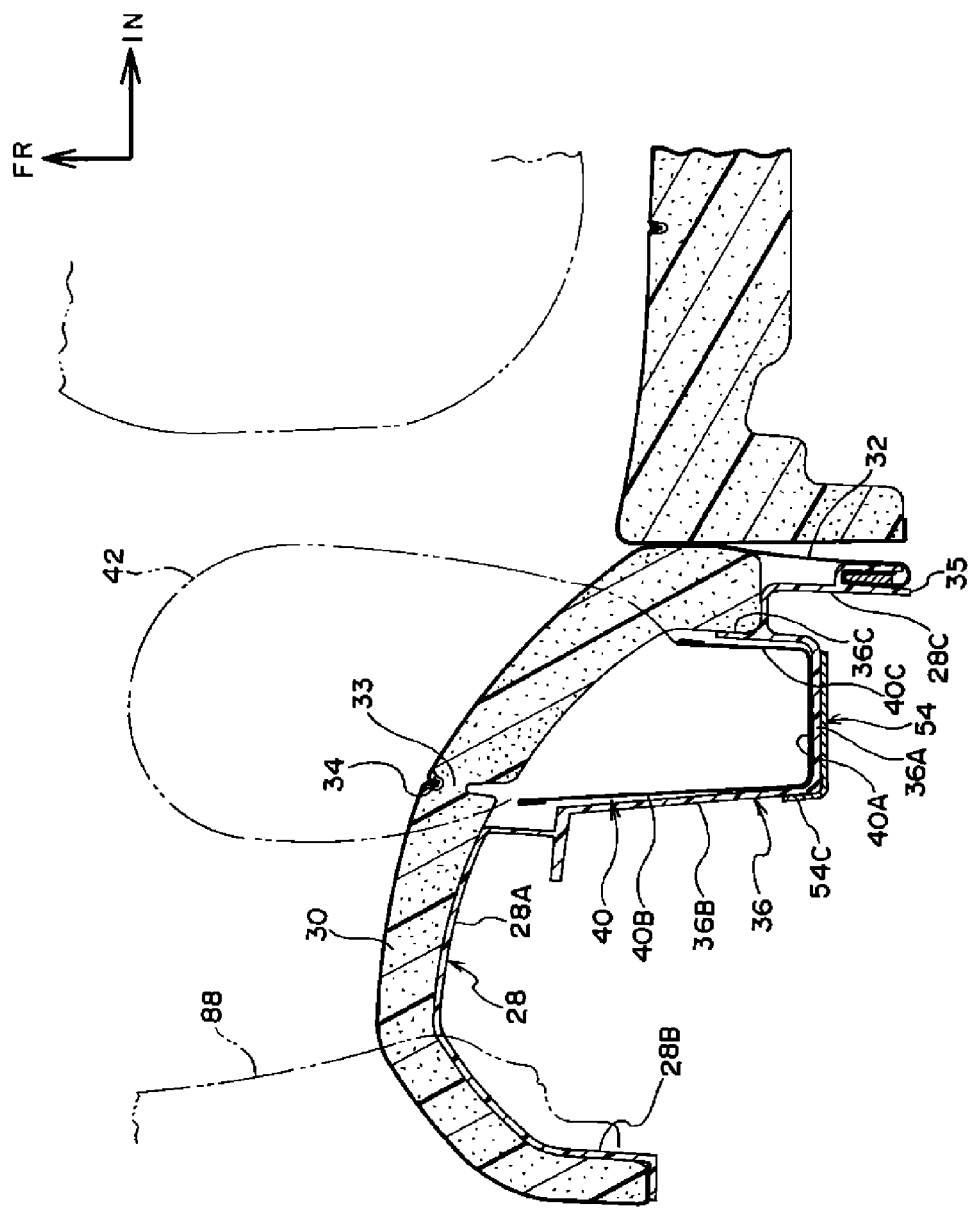
FIG. 2 is a magnified plan sectional diagram of the rear seat side airbag device in which a sectional plane along line 2-2 of FIG. 1 is shown magnified.

With the rear seat side airbag device 10 according to the present exemplary embodiment, if the vehicle has a side collision, a side collision condition is detected by a side collision sensor, which is not shown in the drawings, provided at a vehicle body side portion such as a center pillar, a rear pillar or the like. A detection signal is outputted from the side collision sensor to the airbag ECU, and a determination is made by the airbag ECU to operate the rear seat side airbag device 10. Accordingly, the inflator 44 is operated by the airbag ECU; that is, a predetermined current is passed through the squib of the inflator 44. Consequently, a large volume of gas is produced from the inflator 44, and the side airbag 42 stowed in the folded state in the module case 40 inflates. The inflation pressure of the side airbag 42 acts on the seam portion 34 of the cover 32 of the side support portions 26, via the upper side webbing 60 and the lower side webbings 74 and 76, and the seam portion 34 defining the burst line is ruptured. Thus, an opening is formed in the front face side of the side support portion 26, and the side airbag 42 inflates and deploys through this opening, as shown in FIG. 1 and FIG. 2, to between the upper body of an occupant, including the waist area and torso area, and a door trim 88 of a rear side door. Hence, the side airbag 42 protects the occupant from an impact during the side collision.

Now, when both the waist area and torso area of a seat occupant are to be protected by the single side airbag 42 as in the present exemplary embodiment, the side airbag 42 is large in the seatback height direction. When this large side airbag 42 is used, the surface of the side airbag 42 might come into contact with the tip edge of the upper wall portion 40D of the module case 40 and the tip edge of the lower wall portion 40E when the side airbag 42 is inflating and deploying, and that the deployment of the side airbag might be impeded or the surface of the side airbag might be damaged.

However, according to the present exemplary embodiment, the upper wall portion 40D and lower wall portion 40E of the module case 40 are disposed at positions spaced apart from the upper end 42A and lower end 42B of the side airbag 42 in the folded state such that the tip edge of the upper wall portion 40D of the module case 40 and the tip edge of the lower wall portion 40E are separated from the surface of the side airbag 42 in the deployed state (the side airbag 42 in the state illustrated in FIG. 1 and FIG. 7). In other words, a sufficient gap, the upper side gap 80, is formed between the tip edge of the upper wall portion 40D of the module case 40 and the upper end 42A of the side airbag 42 in the folded state, and a sufficient gap, the lower side gap 82, is formed between the tip edge of the lower wall portion 40E of the module case 40 and the lower end 42B of the side airbag 42 in the folded state. In consequence, the possibility of the side airbag 42 coming into contact with the tip edge of the upper wall portion 40D and the tip edge of the lower wall portion 40E of the module case 40 when deploying is reduced remarkably.

Therefore, according to the rear seat side airbag device 10 according to the present exemplary embodiment, the side airbag 42 may be smoothly deployed when there is a side collision, and damage to the side airbag 42 at the edges of the module case 40 (of the upper wall portion 40D and the like) may be prevented or suppressed.

In the present exemplary embodiment, the length H1 of the upper wall portion 40D of the module case 40 is set shorter than the length H2 of the upper wall portion 36D of the recess portion 36. Therefore, even if the attitude of the side airbag 42 becomes unstable during inflation and deployment, damage to the surface of the side airbag 42 may be prevented or suppressed. That is, until the deployment of the side airbag 42 is complete, the side airbag 42 may pitch in the seatback height direction and the deployment action may be unstable. In such a case, even though the tip edge of the upper wall portion 40D of the module case 40 is spaced apart from the surface of the deployed shape of the side airbag 42, the side airbag 42 might swing up to the outer side of the tip edge of the upper wall portion 40D (the gap between the upper wall portion 40D and the upper wall portion 36D of the recess portion 36).

However, because the structure described above is employed, the length H1 of the upper wall portion 40D of the module case 40 is shorter than the length H2 of the upper wall portion 36D of the recess portion 36, and the upper end 42A side of the side airbag 42 first comes into contact with the tip edge of the upper wall portion 36D of the recess portion 36 formed in the seat frame 28 made of resin. Thus, the side airbag 42 does not strongly contact the tip edge of the upper wall portion 40D of the module case 40. Therefore, according to the present exemplary embodiment, damage to the surface at the upper end 42A side of the side airbag 42 may be prevented or suppressed.

Further, in the present exemplary embodiment, the rim portion of the upper wall portion 40D of the module case 40 is folded back to the outer side of the module case 40 to provide the folded-back portion 84. Therefore, the upper end 42A of the side airbag 42 is very unlikely to make contact with the rim portion of the upper wall portion 40D of the module case 40 (a distal end of the folded-back portion 84). Thus, compared to a case in which the rim portion of an upper wall portion of a module case is not folded back, damage to the surface of the side airbag 42 may be even further prevented or suppressed.

Further still, in the present exemplary embodiment, the upper side gap 80 is formed at the upper wall portion 40D side of the module case 40 and the lower side gap 82 is formed at the lower wall portion 40E side, and the protrusion portion 86 that is integrally formed at the lower end portion of the pad 30 is inserted into the lower side gap 82. Thus, if the side support portion 26 is pressed from the side of a design surface in the cabin, the design surface is unlikely to recess in an unintended manner. Therefore, according to the present exemplary embodiment, the design appearance of the side support portions 26 of the rear seat 12 may be excellently maintained.

—Supplementary Descriptions of the Above Exemplary Embodiment—

Figure 8:
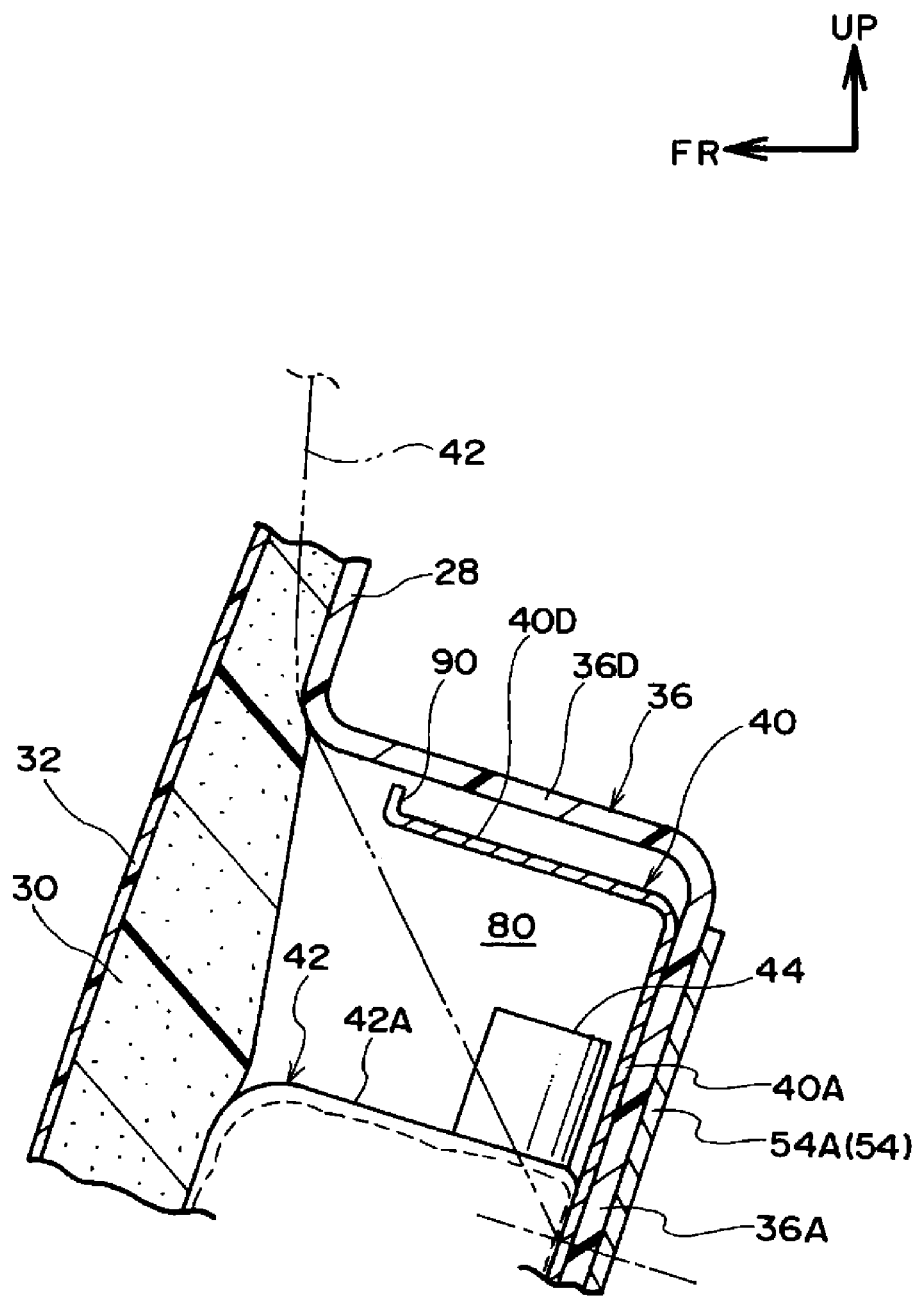
FIG. 8 is a magnified vertical sectional diagram of the rear seat side airbag device, corresponding to FIG. 7, showing a variant example in which a rim portion of an upper wall portion of the module case is inflected to the outer side.

(1) The exemplary embodiment described above employs a structure in which the rim portion of the upper wall portion 40D of the module case 40 is folded back to the outer side of the module case 40 to provide the folded-back portion 84, but this is not limiting. As illustrated in FIG. 8, a structure may be employed in which the rim portion of the upper wall portion 40D of the module case 40 is inflected at, for example, a right angle toward the outer side of the module case 40 to provide an inflected portion 90. With this structure too, the upper end 42A side of the side airbag 42 is unlikely to come into contact with the rim portion of the upper wall portion 40D (an end portion of the inflected portion 90). Therefore, damage to the surface at the upper end 42A side of the side airbag 42 may be further prevented or suppressed. Alternatively, the inventions recited in claims 1 to 3 encompass structures in which neither the folded-back portion 84 nor the inflected portion 90 or the like is provided.

Figure 9:
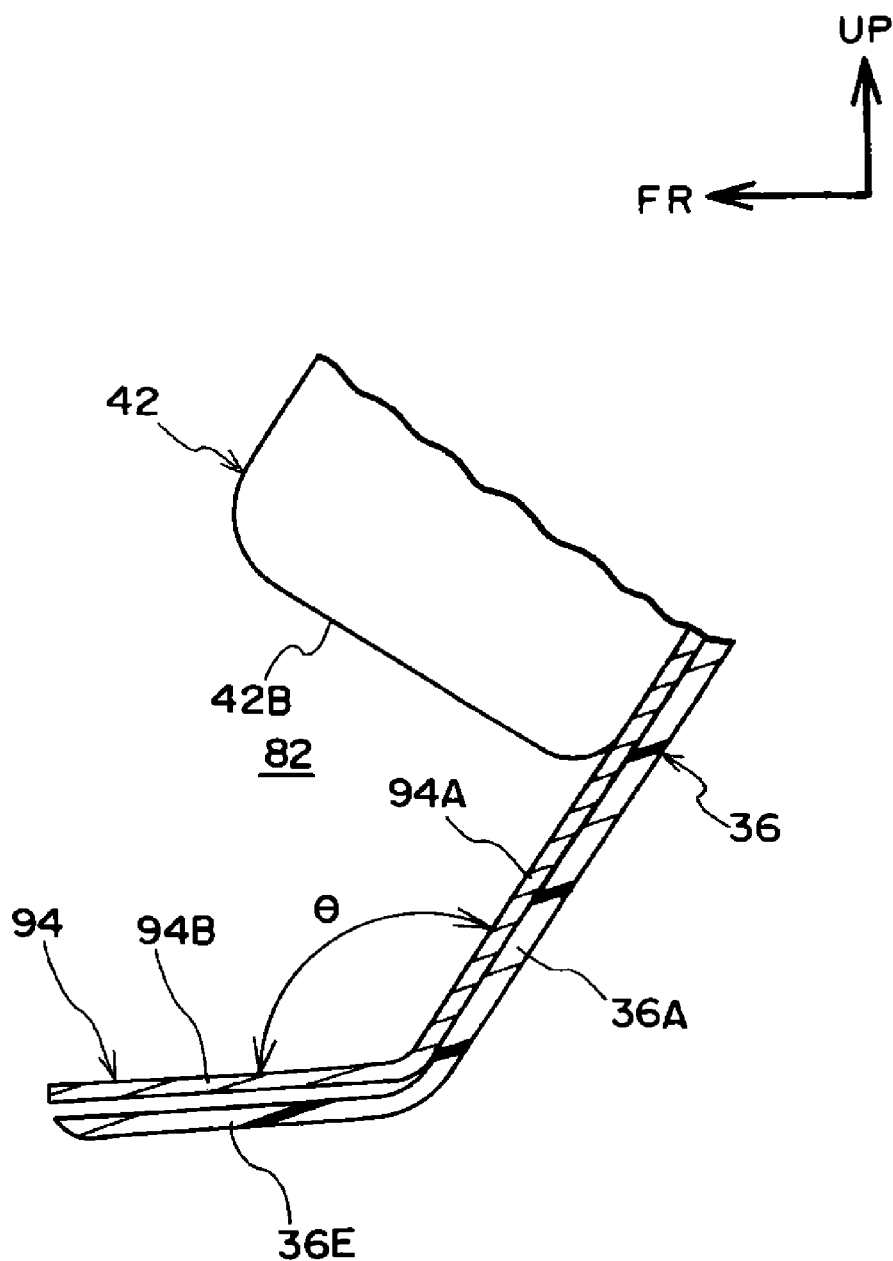
FIG. 9 is a partial magnified vertical sectional diagram showing a variant example in which a lower wall portion of the module case is provided standing at an obtuse angle relative to a bottom wall portion.

(2) In the exemplary embodiment described above, the upper wall portion 40D and lower wall portion 40E of the module case 40 rise perpendicularly or substantially perpendicularly from the bottom wall portion 40A, but this is not limiting. As illustrated in FIG. 9, a module case 94 may be formed in which an angle (θ) formed between a bottom wall portion 94A and a lower wall portion 94B is set to an obtuse angle. That is, one or both of the upper wall portion 40D and the lower wall portion 40E may be inclined at a predetermined angle to be obtuse with respect to the bottom wall portion 40A. In this case, the following operation and effect are provided. The side airbag 42 that is stowed in the folded state at the bottom wall portion 94A side deploys along the lower wall portion 94B of the module case 94. Therefore, the more obtuse the angle θ formed between the lower wall portion 94B and the bottom wall portion 94A, the more lightly the lower end 42B side of the side airbag 42 impinges on a rim portion of the lower wall portion 94B. Hence, the surface of the lower end 42B side of the side airbag 42 is less likely to be damaged.

The invention claimed is:

1. A rear seat side airbag device comprising:
   a recess portion formed in a seat frame fabricated of resin, the seat frame being disposed at an inner side of a side support portion of a seatback of a rear seat, and a seatback forward side of the recess portion being open;
   a module case fabricated of metal that is formed in a box shape, the module case being accommodated in the recess portion such that the seatback forward side of the module case is an open side, such that an upper wall portion of the module case is disposed at the inner side of an interior wall upper portion of the recess portion, and such that a lower wall portion of the module case is disposed at the inner side of an interior wall lower portion of the recess portion;
   an inflator that is accommodated in the module case and that produces gas when operated; and
   a side airbag that is accommodated in the module case in a folded state and that is deployed to the seatback forward side when the gas flows into the side airbag,
   wherein the upper wall portion and lower wall portion of the module case are provided standing at positions spaced apart from an upper end and a lower end of the side airbag in the folded state such that a tip edge of the upper wall portion of the module case and a tip edge of the lower wall portion of the module case are spaced apart from a surface of the side airbag in the deployed state.

2. The rear seat side airbag device according to claim 1, wherein a length of the upper wall portion of the module case is set shorter than a length of the interior wall upper portion of the recess portion.

3. The rear seat side airbag device according to claim 1, wherein a length of the lower wall portion of the module case is set shorter than a length of the interior wall lower portion of the recess portion.

4. The rear seat side airbag device according to claim 1, wherein at least one of a tip edge portion of the upper wall portion of the module case or a tip edge portion of the lower wall portion of the module case is inflected to the outer side of the module case.

5. The rear seat side airbag device according to claim 1, wherein at least one of a tip edge portion of the upper wall portion of the module case or a tip edge portion of the lower wall portion of the module case is folded back to the outer side of the module case.

6. The rear seat side airbag device according to claim 1, wherein a protrusion portion formed at a seatback pad is inserted into at least one of
   a lower portion gap formed between the lower wall portion of the module case and the interior wall lower portion of the recess portion, or
   an upper portion gap formed between the upper wall portion of the module case and the interior wall upper portion of the recess portion.

\* \* \* \* \*